(12) United States Patent
Murakami

(10) Patent No.: US 7,392,528 B2
(45) Date of Patent: Jun. 24, 2008

(54) CLAMPER PLATE OF A DISK PLAYER

(75) Inventor: Takayuki Murakami, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 555 days.

(21) Appl. No.: 10/824,608

(22) Filed: Apr. 15, 2004

(65) Prior Publication Data

US 2004/0218482 A1 Nov. 4, 2004

(30) Foreign Application Priority Data

Apr. 16, 2003 (JP) .......................... P2003-111172

(51) Int. Cl.
*G11B 17/04* (2006.01)
*G11B 33/02* (2006.01)

(52) U.S. Cl. ...................... 720/604; 720/712

(58) Field of Classification Search ............... 369/30.63, 369/270; 720/604, 712, 706; *G11B 17/03, G11B 17/08, 7/04, 7/03*
See application file for complete search history.

(56) References Cited

U.S. PATENT DOCUMENTS

| 4,996,615 | A  | * | 2/1991 | Iwanaga ................... 360/254.1 |
| 6,347,070 | B1 | * | 2/2002 | Fahey et al. .................. 720/706 |
| 7,076,790 | B2 | * | 7/2006 | Satoh ......................... 720/604 |
| 7,088,554 | B2 | * | 8/2006 | Nojima ..................... 360/244.9 |

| 2001/0043459 | A1 | * | 11/2001 | Lindrose ..................... 361/685 |
| 2002/0009036 | A1 | * | 1/2002 | Omori ......................... 369/75.2 |
| 2002/0024921 | A1 | * | 2/2002 | Sogawa et al. ............... 369/270 |
| 2002/0150027 | A1 | * | 10/2002 | Kato ........................... 369/270 |
| 2004/0218482 | A1 | * | 11/2004 | Murakami ............... 369/30.63 |

FOREIGN PATENT DOCUMENTS

| JP | 31-4361     | 6/1931  |
| JP | 7-235173    | 9/1995  |
| JP | 7-279916    | 10/1995 |
| JP | 9-51153     | 2/1997  |
| JP | 9-91826     | 4/1997  |
| JP | A-9-297951  | 11/1997 |
| JP | A-11-054949 | 2/1999  |
| JP | 11-193035   | 7/1999  |

OTHER PUBLICATIONS

MAT (machine assisted translation) of JP 11-054949.*

* cited by examiner

*Primary Examiner*—Brian E. Miller
(74) *Attorney, Agent, or Firm*—Morgan, Lewis & Bockius LLP

(57) ABSTRACT

A disk player is configured so that a steel plate-made clamper plate 3 is bridged between wall parts 2a of both sides of a cabinet and is fixed and a disk D on a tray 1 is clamped by a turntable 7 and a clamper 5 and the disk D is rotated by the turntable 7 and information recorded on the disk D is read by an optical pickup, spiral reinforcement portions 3c are formed by closely folding both side edges of the clamper plate 3 in a manner of winding at least two times.

12 Claims, 11 Drawing Sheets

PRIOR ART

PRIOR ART

CLAMPER PLATE OF A DISK PLAYER

BACKGROUND OF THE INVENTION

1. Field of the Invention

The present invention relates to a disk player for performing reproduction or recording with respect to magneto-optical disks or optical disks such as CD or DVD (hereinafter abbreviated to a disk), and particularly to a disk player in which strength of a clamper plate is increased.

2. Description of the Related Art

Conventionally, as a technique of a disk player, there is a technique described in JP-A-9-297951 and referring to its one example based on FIGS. 12 to 14, substantially L-shaped reinforcement portions 3a are formed by perpendicularly folding both side edges of a steel plate-made clamper plate 3 bridged along right and left directions AC, AD orthogonal to backward and forward directions AA, AB between wall parts 2a of both sides of a cabinet 2 in which a tray 1 for a disk D is retractably placed in directions of arrows AA, AB, and both ends of the clamper plate 3 are fixed in the wall parts 2a of both sides of the cabinet 2 by screws 4. In FIG. 13, numeral 5 is a clamper engaged in a guide hole 6 formed in the center of the clamper plate 3, and comprises a clamper body 5a, a pair of upper and lower flange parts 5b, 5c fastened in upper and lower ends of the clamper body 5a and a magnet 5d fastened on a ceiling surface of the clamper body 5a, and is formed up-and-down movably within a predetermined range by a clearance a between the clamper plate 3 and the lower flange part 5c. Numeral 7 is a turntable placed up-and-down movably inside the cabinet 2.

Referring to a loading procedure of the disk D, as shown by an imaginary line in FIG. 12, by retracting b the tray 1 based on a loading signal after putting the disk D on the tray 1 in a state of forward a, the disk D on the tray 1 is positioned in a state concentric with the clamper 5 and the turntable 7 as shown in FIG. 13. Next, the turntable 7 is moved upward through a through hole 1a of the tray 1 and thereby, a center protrusion 7a of the turntable 7 is fitted into a center hole Da of the disk D to lift the disk D and thereby, as shown in FIG. 14, the clamper 5 is pushed up by the disk D and the disk D is clamped by the clamper 5 and the turntable 7 and the disk D is rotated by the turntable 7 and thereby, information recorded on the disk D is read by an optical pickup (not shown).

In a static load test before shipment, as shown by the imaginary line in FIG. 12, a test bar 8 is randomly pushed on the clamper plate 3 and a predetermined load is imposed and thereby, it is checked whether or not the clamper plate 3 is deformed and it is confirmed that strength of its clamper plate 3 is a predetermined value or more.

In the conventional configuration described above, in order to increase strength of the clamper plate 3, the reinforcement portions 3a are formed in both side edges of its clamper plate, but the reinforcement portions 3a are only formed in substantially L shape by perpendicularly folding the both side edges of the clamper plate 3, so that the amount of increase in strength by the reinforcement portions 3a is relatively small. Thus, for example, a steel plate with a relatively large wall thickness t of about 0.8 mm is used as the clamper plate 3 to increase rigidity in the clamper plate 3, but this increases material cost due to use of the steel plate with the large wall thickness t and also narrows a clearance α of the clamper 5 by the amount of the large wall thickness t, so that it is necessary to increase a height of the clamper 5 in order to ensure its clearance α sufficiently and this results in upsizing of a disk player.

Thus, based on a technique described in JP-A-11-054949, as shown in FIG. 15, it is considered that substantially rectangular reinforcement portions 3b are formed by folding both sides of a clamper plate 3 plural times. However, as a result of this, strength can be increased with respect to loads of directions of F2 and F4 but strength cannot be much increased with respect to loads of directions of F1 and F3 due to a relatively large gap 9 inside the substantially rectangular reinforcement part 3b. Therefore, also in this case, it is necessary to increase rigidity in the clamper plate 3 using a steel plate with a relatively large wall thickness t.

SUMMARY OF THE INVENTION

It is therefore an object of the invention to provide a disk player using a clamper plate in which strength is increased with respect to loads of all directions.

In order to achieve the object, according to a first aspect of the invention, there is provided a disk player for rotating a disk and reads information recorded on the disk, the disk player including: a cabinet; a disk tray on which the disk is placed and retractively disposed in the cabinet; a clamper plate made of steel in which both ends thereof being bridged between wall parts provided on both sides of the cabinet; a turntable disposed in the cabinet and moves the disk placed on the disk tray in an up-and-down direction, and rotates the disk; a clamper engaged in a guide hole formed in a center of the clamper plate so as to move in an up-and-down direction within a predetermined range, and clamps the disk with the turntable; an optical pickup that reads the information recorded on the disk; a reinforcement portions in which formed by folding up both side edges of the clamper plate; an annular reinforcement projection formed by partially bending the clamper plate in a downward direction and surrounds the periphery of the guide hole; linear reinforcement projections extending from the annular reinforcement projection toward both ends of the clamper plate; screw receiving seats formed by folding both ends of the clamper plate at center part in a downward direction; recess cradles into which the screw receiving seats are fitted, and formed in the wall parts of the cabinet at a position where opposed to the screw receiving seats; a pair of elongated holes formed in both ends of the clamper plate; a pair of positioning protrusions protrusively provided in the wall parts of the cabinet, and into which the pair of elongated holes are respectively fitted; side plate parts formed by perpendicularly folding both ends of the clamper plate in a downward direction, the plate parts that abut on outsides of the wall parts of both sides of the cabinet; engagement pieces protrusively provided on outsides of the wall parts of the cabinet; and engagement openings formed on each of the side plate parts and removably engages with the engagement pieces, wherein the reinforcement portions are spirally formed by closely folding up both side edges of the clamper plate in a manner of winding at least two times, wherein protrusion depths of the screw receiving seats are configured to be slightly smaller than or equal to depths of the recess cradles, and wherein the clamper plate is fixed to the wall parts of the cabinet by screws that are screwed into screw holes formed on the recess cradles through the screw receiving seats, whereby both ends of the clamper plate are pushed on upper surfaces of the wall parts.

According to a second aspect of the invention, there is provided a disk player for rotating a disk and reads information recorded on the disk, the disk player including: a cabinet; a disk tray on which the disk is placed and retractively disposed in the cabinet; a clamper plate made of steel in which both ends thereof being bridged between wall parts provided on both sides of the cabinet; a turntable disposed in the cabinet and moves the disk placed on the disk tray in an up-and-down direction, and rotates the disk; a clamper engaged in a guide hole formed in a center of the clamper plate so as to move in an up-and-down direction within a predetermined range, and clamps the disk with the turntable; an optical pickup that reads the information recorded on the disk; and a reinforcement portions in which formed by folding up both side edges of the clamper plate.

BRIEF DESCRIPTION OF THE DRAWINGS

The above objects and advantages of the present invention will become more apparent by describing a preferred embodiment thereof in detail with reference to the accompanying drawings, wherein.

DETAILED DESCRIPTION OF THE PREFERRED EMBODIMENTS

Referring now to the accompanying drawings, a description will be given in detail of an optical disk apparatus according to a preferred embodiment of the invention.

Figure 1:
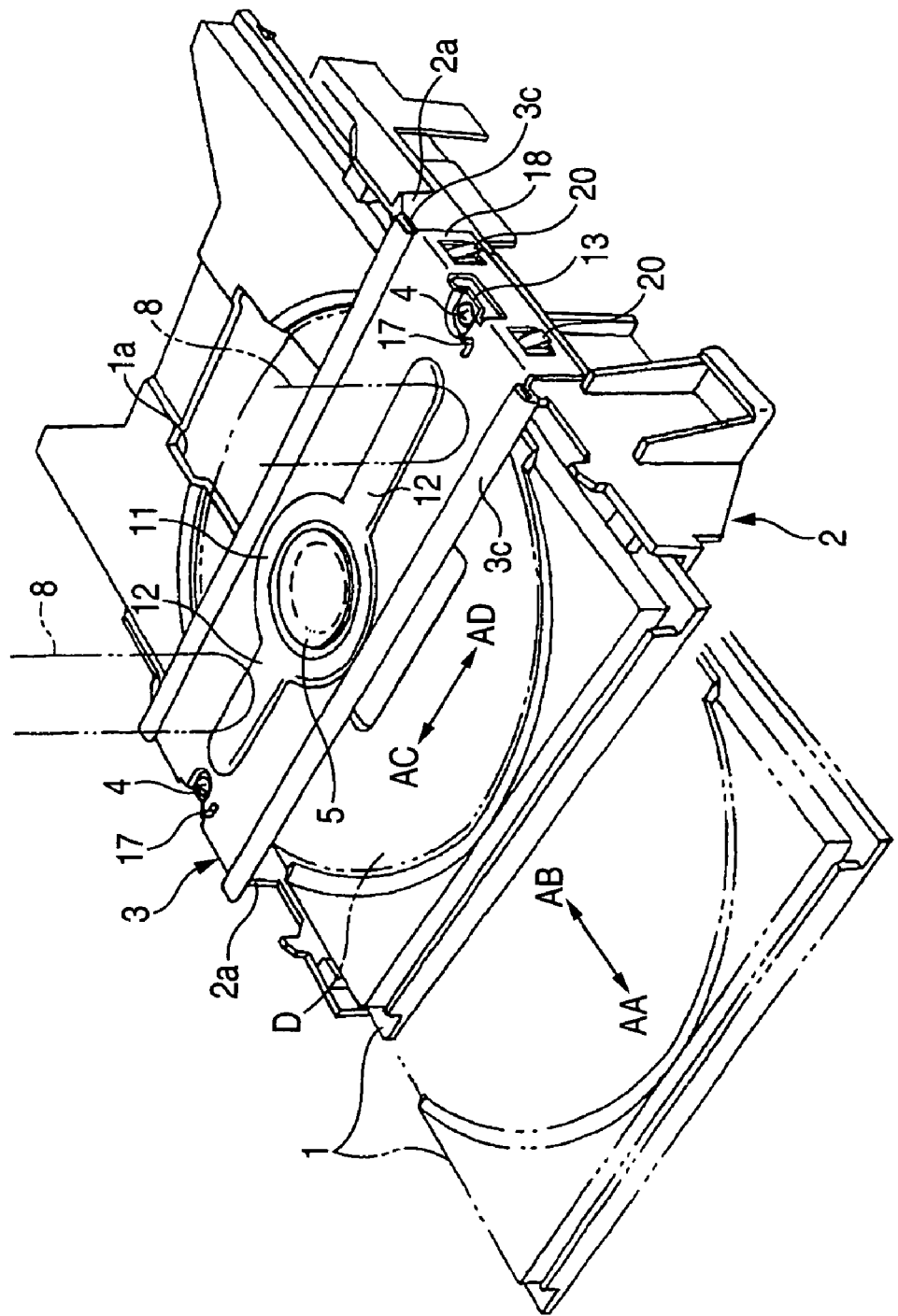
FIG. 1 is a perspective view of a disk player which is one embodiment of the invention.
Figure 2:
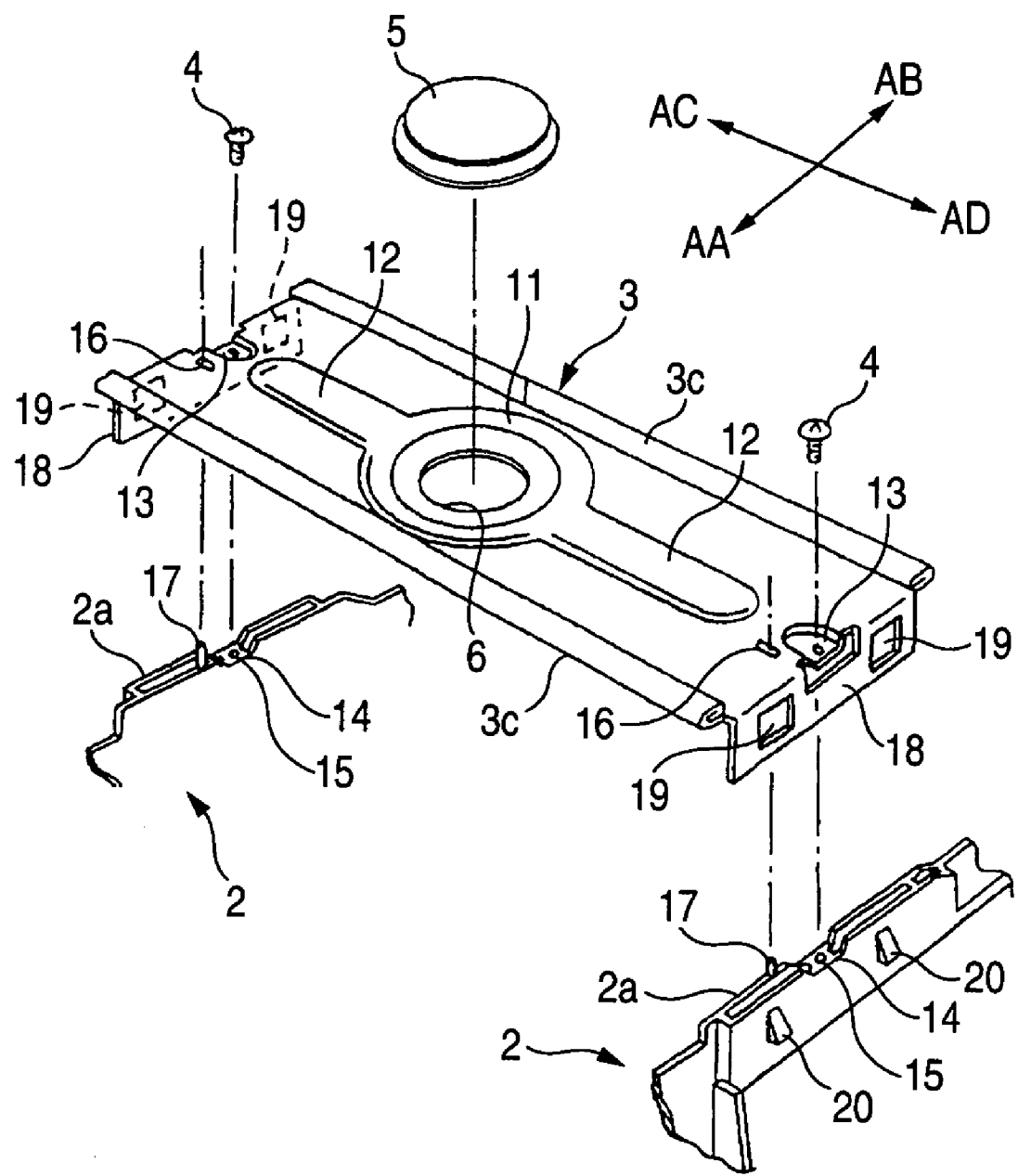
FIG. 2 is an exploded perspective view of a main part of the same disk player.
Figure 3:
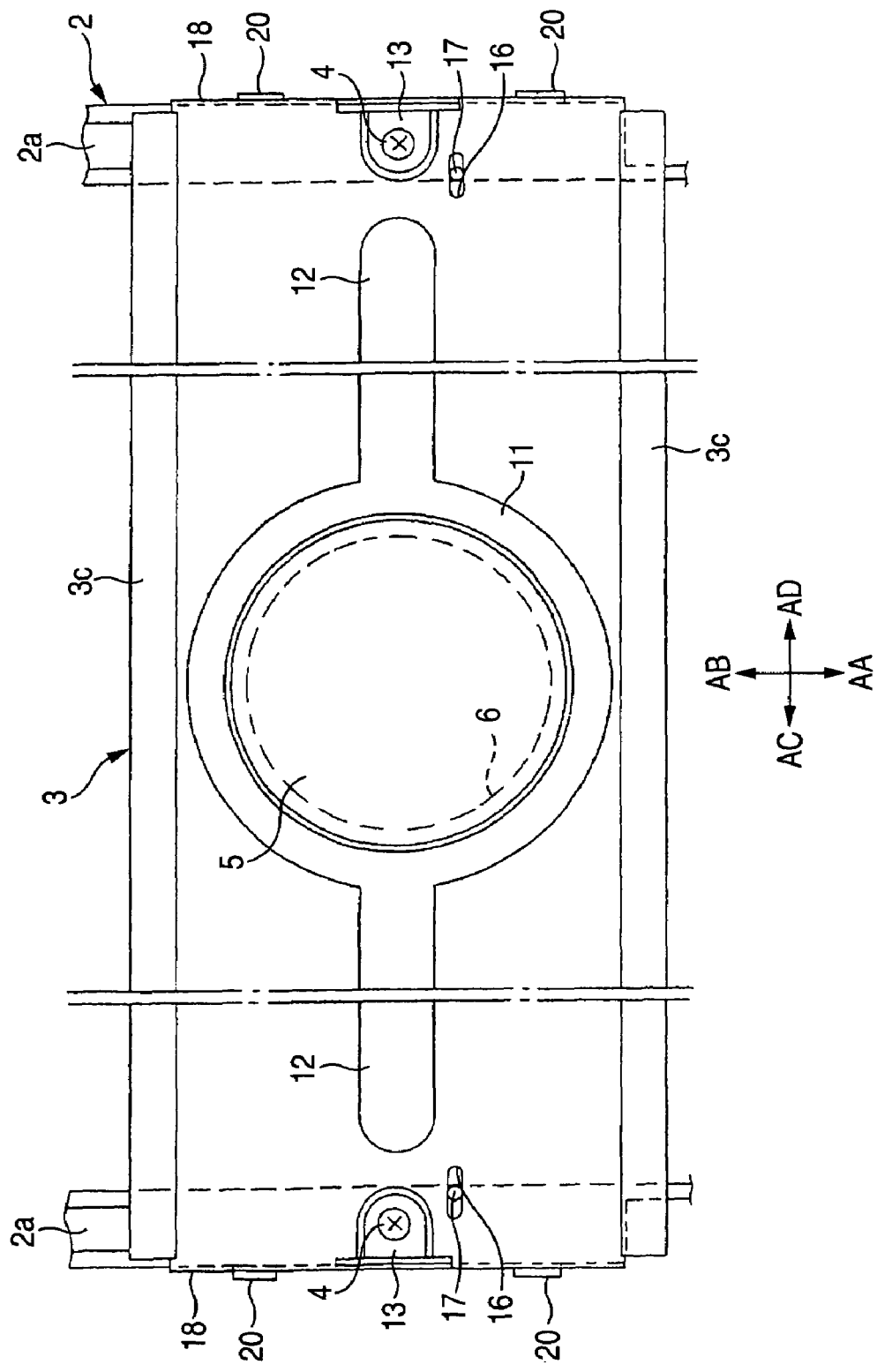
FIG. 3 is a plan view of a main part of the same disk player.
Figure 4:
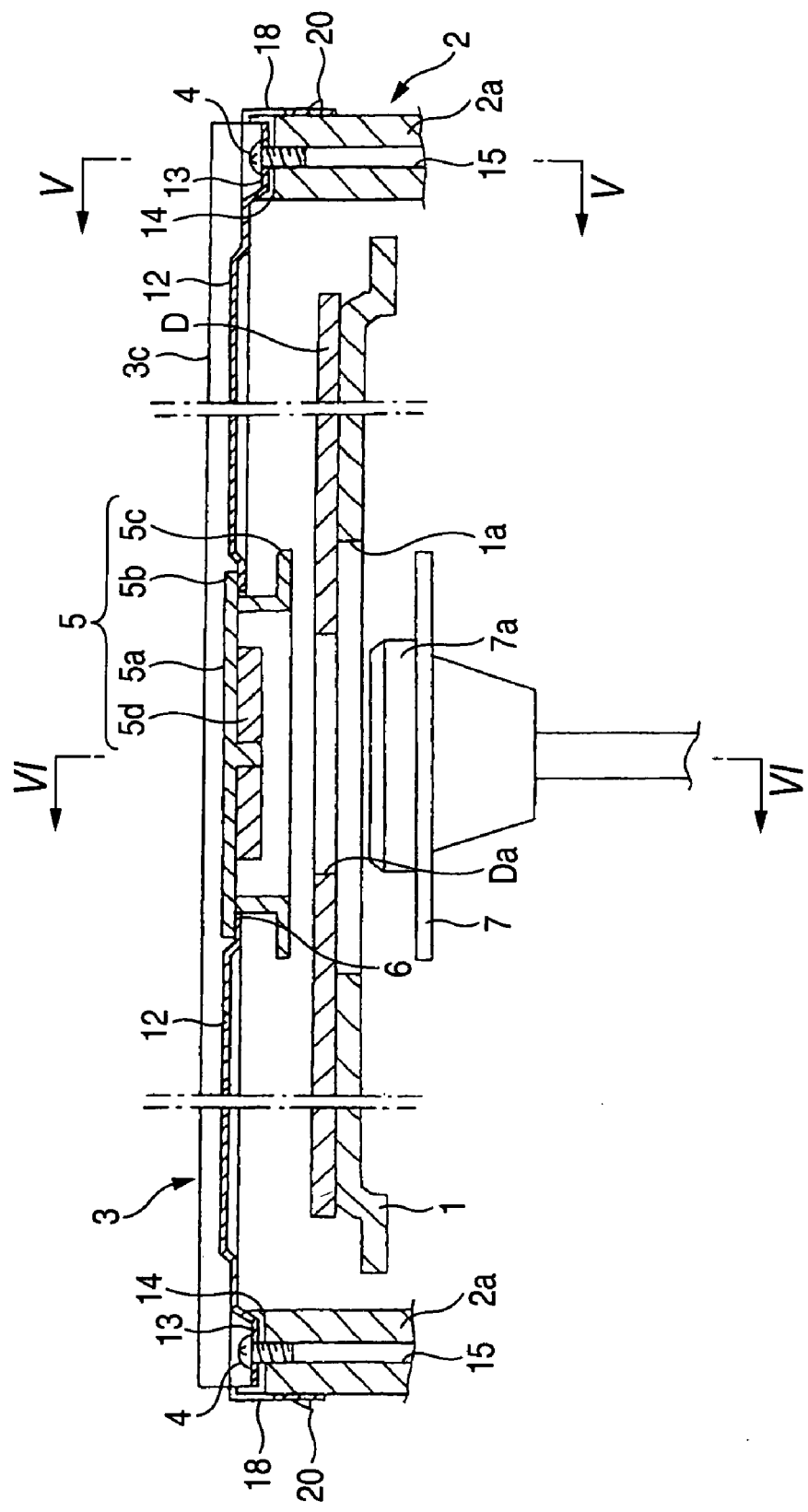
FIG. 4 is a longitudinal sectional view of a main part of the same disk player.
Figure 5:
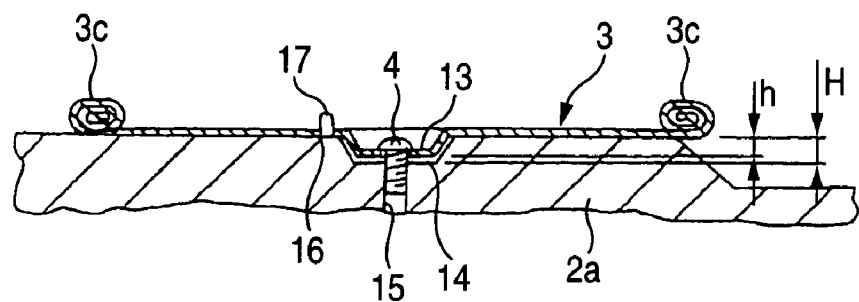
FIG. 5 is a diagram taken on V-V line of FIG. 4.
Figure 12:
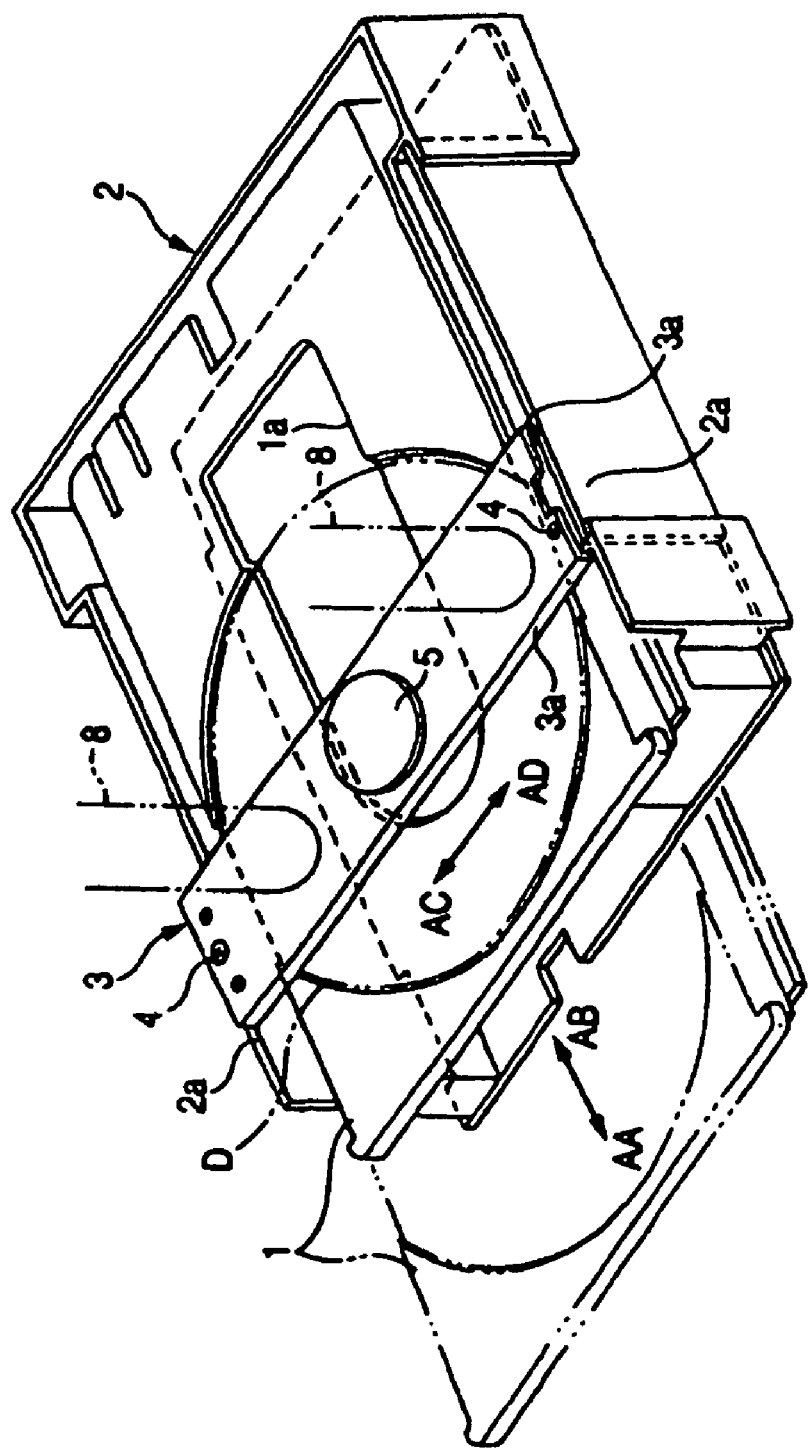
FIG. 12 is a perspective view showing a conventional example.
Figure 13:
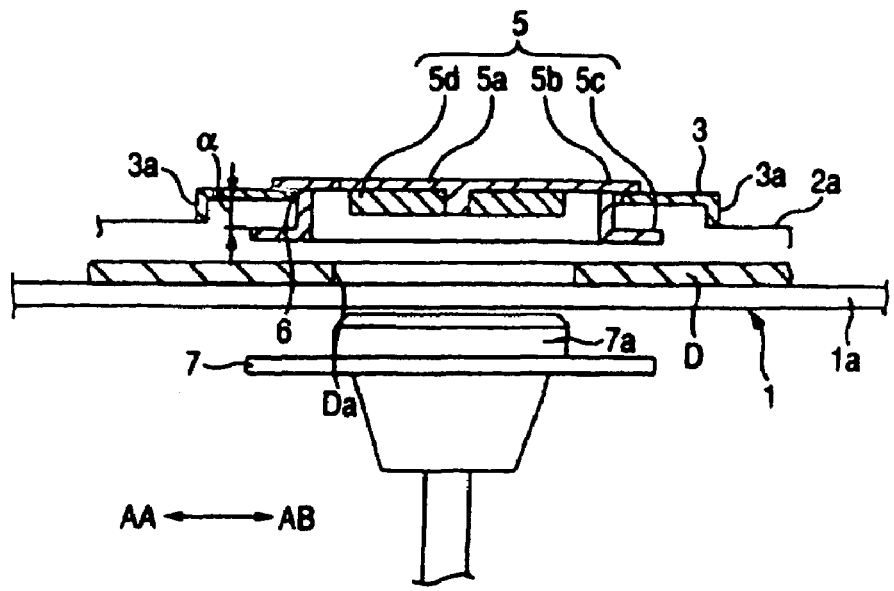
FIG. 13 is a transverse sectional view of a main part of the same example.
Figure 14:
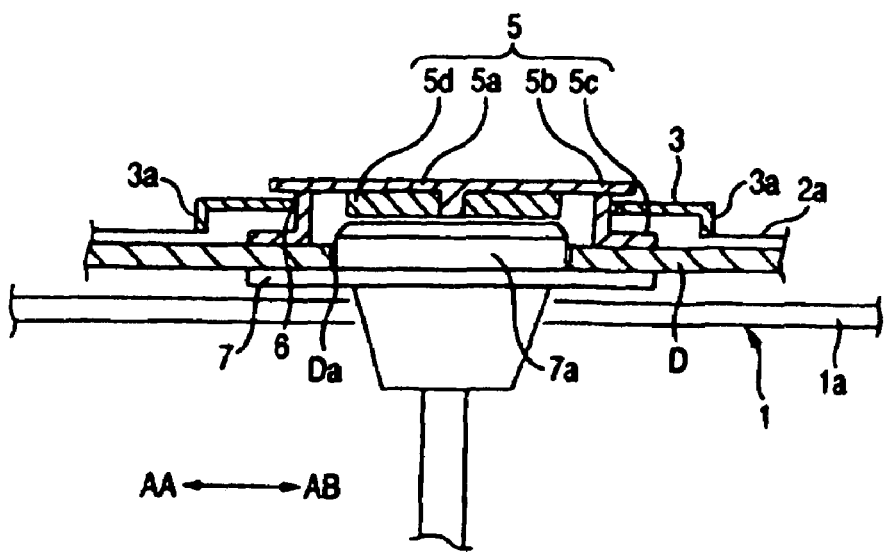
FIG. 14 is a transverse sectional view of a disk clamp state of the same example.

FIGS. 1 through 6 show a disk player as an embodiment of the invention, and spiral reinforcement portions 3c are formed by closely folding both side edges of a clamper plate 3 in a triple folding manner and as shown in FIG. 2, an annular reinforcement projection 11 surrounding the periphery of a guide hole 6 and linear reinforcement projections 12 extending from the annular reinforcement projection 11 toward both ends of the clamper plate 3 are formed by partially pushing and bending the clamper plate 3 and as shown in FIGS. 4 and 5, screw receiving seats 13 are formed by downward folding the centers of both ends of the clamper plate 3 and recess cradles 14 are formed in wall parts 2a of both sides of a cabinet 2 opposed to the screw receiving seats 13 and protrusion depths h of the screw receiving seats 13 are set to sizes slightly smaller than or equal to depths H of the recess cradles 14 and the screw receiving seats 13 are fitted into the recess cradles 14 and screws 4 are screwed into screw holes 15 of the recess cradles 14 through the screw receiving seats 13 and thereby both ends of the clamper plate 3 are pushed on upper surfaces of the wall parts 2a of both sides of the cabinet 2 and as shown in FIGS. 2 and 3, a pair of elongated holes 16 formed in both ends of the clamper plate 3 along right and left directions AC, AD are respectively fitted in a pair of positioning protrusions 17 protrusively provided in the wall parts 2a of both sides of the cabinet 2 and side plate parts 18 perpendicularly folded downward from both ends of the clamper plate 3 are abutted on outsides of the wall parts 2a of both sides of the cabinet 2 and as shown in FIGS. 2 and 3, a pair of engagement openings 19 provided through each of the side plate parts 18 are removably engaged with engagement pieces 20 protrusively provided on outsides of the wall parts 2a of both sides of the cabinet 2. Since a configuration other than the above is substantially similar to the configuration shown in FIGS. 12 through 14, the description is omitted by attaching the same signs to the same portions.

Figure 6:
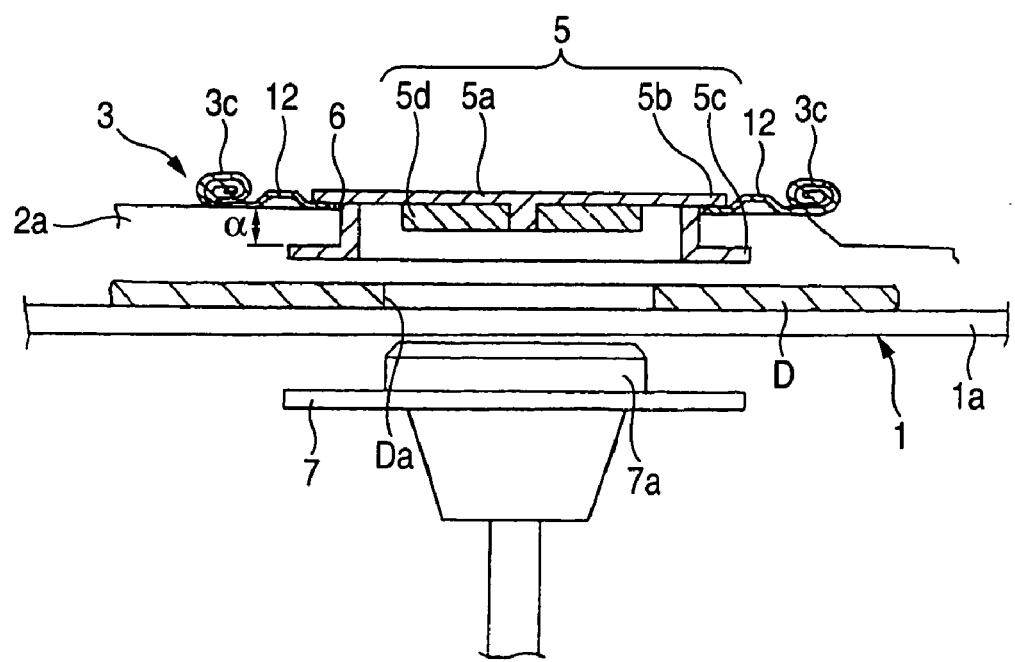
FIG. 6 is a diagram taken on VI-VI line of FIG. 4.
Figure 7:
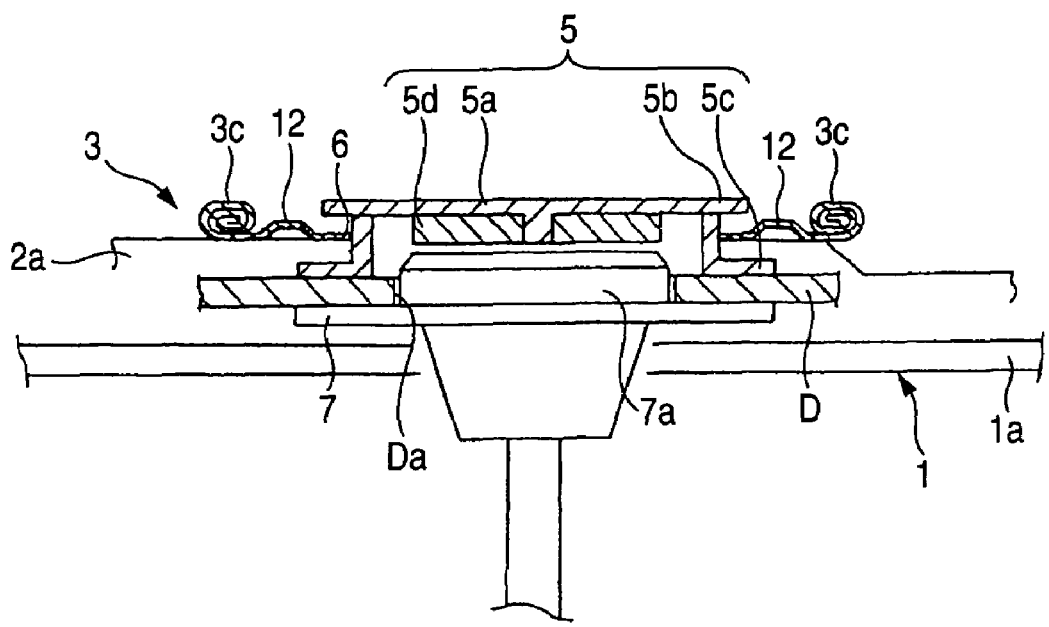
FIG. 7 is a transverse sectional view of a disk clamp state of the same disk player.

A loading procedure of a disk D is substantially similar to the conventional procedure, and as shown in FIG. 6, after retracting b a tray 1 based on a loading signal, the disk D on the tray 1 is clamped by a turntable 7 and a clamper 5 (see FIG. 7) and the disk D is rotated by the turntable 7 and thereby, information recorded on the disk D is read by an optical pickup (not shown).

Figure 8:
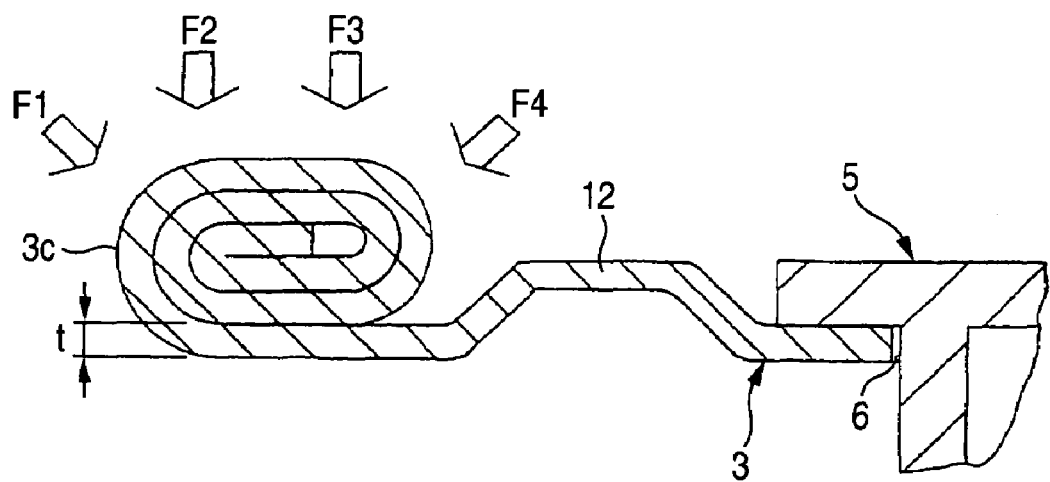
FIG. 8 is an enlarged transverse sectional view of a spiral reinforcement part of the same disk player.
Figure 9A:
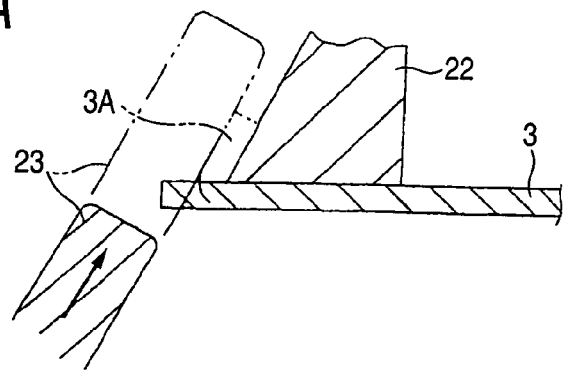
FIGS. 9A through 9D are explanatory diagrams showing a formation procedure of a reinforcement part.
Figure 9B:
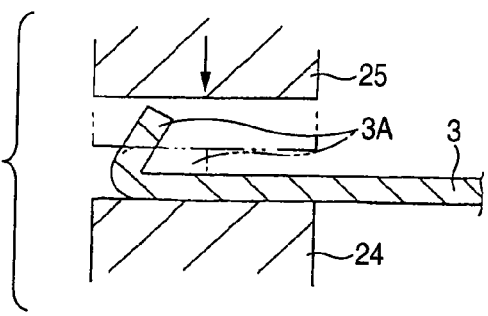
Figure 9C:
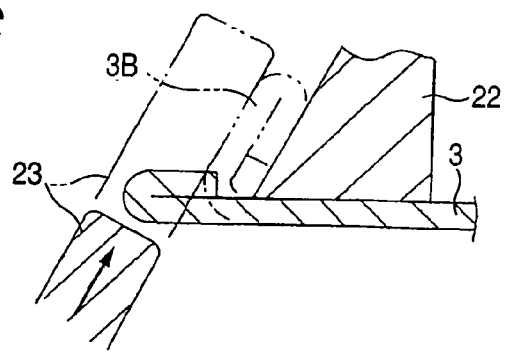
Figure 9D:
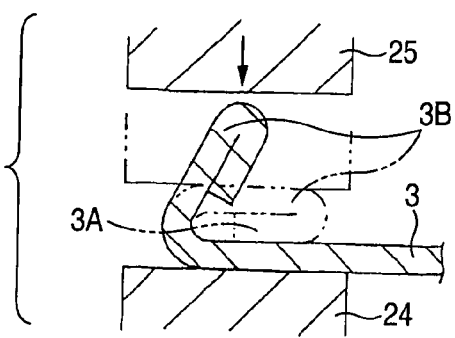

Referring to a formation procedure of the spiral reinforcement part 3c, as shown in FIG. 9A, a fixed block 22 is abutted on a side edge upper surface of a clamper plate 3 punched in predetermined shape by a press and a movable block 23 is pushed up and a side edge of the clamper plate 3 is folded in substantially L-letter shape to form a first piece 3A and as shown in FIG. 9B, a fixed block 24 is abutted on a side edge lower surface of the clamper plate 3 and a movable block 25 is pushed down and the first piece 3A is brought into close contact with the side edge of the clamper plate 3 and as shown in FIG. 9C, the fixed block 22 is abutted on the side edge upper surface of the clamper plate 3 and the movable block 23 is pushed up and a side edge of the clamper plate 3 is folded in substantially L-letter shape to form a second piece 3B and as shown in FIG. 9D, the fixed block 24 is abutted on the side edge lower surface of the clamper plate 3 and the movable block 25 is pushed down and the second piece 3B is brought into close contact with the side edge of the clamper plate 3 and by repeating similar procedure below, the side edge of the clamper plate 3 could be triply wound to form the spiral reinforcement part 3c (see FIG. 8).

According to the configuration described above, the spiral reinforcement portions 3c are formed by closely folding the both side edges of the clamper plate 3 and strength of the clamper plate 3 is increased to a predetermined value or more by the reinforcement portions 3c, so that as shown by an imaginary line in FIG. 1, in a static load test before shipment, even when a test bar 8 is randomly pushed on the clamper plate 3 and a predetermined load is imposed, its clamper plate 3 is not deformed and a strong rigid structure is formed by the clamper plate 3 and the cabinet 2 and protection can be provided surely so as not to damage a drive mechanism or an optical pickup placed in the inside due to a shock such as a fall.

Figure 15:
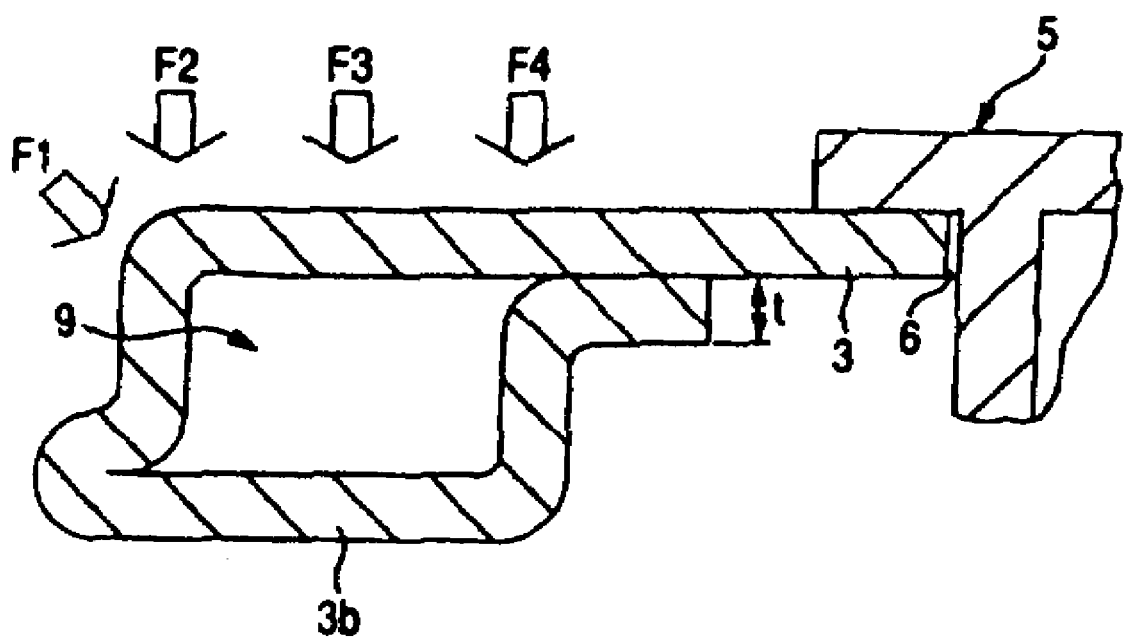
FIG. 15 is an enlarged transverse sectional view showing a modified example of a reinforcement part of the same example.

As shown in FIG. 8, there is only a small gap inside the spiral reinforcement part 3c and a gap corresponding to the conventional relatively large gap 9 (see FIG. 15) is absent, so that even when a load is imposed on its reinforcement part 3c from any directions (F1 to F4), the strength does not decrease. Therefore, the clamper plate 3 can be formed of a steel plate with a small wall thickness t of, for example, 0.6 mm or less as compared with the conventional clamper plate and material cost can be reduced. Also, a clearance α (see FIG. 6) for upward and downward moving the clamper 5 is increased by decreasing the wall thickness t of the clamper plate 3, so that a disk player can also be miniaturized by decreasing a height of the clamper 5 by the increased amount.

Further, as shown in FIG. 2, strength of the clamper plate 3 can be increased more by the annular reinforcement projection 11 and the linear reinforcement projections 12 formed by partially pushing and bending the clamper plate 3.

Furthermore, as shown in FIG. 5, protrusion depths h of the screw receiving seats 13 formed in the centers of both ends of the clamper plate 3 are set to sizes slightly smaller than or equal to depths H of the recess cradles 14 formed in the wall parts 2a of both sides of the cabinet 2, so that the screw receiving seats 13 are fitted into the recess cradles 14 and the screws 4 are screwed into the screw holes 15 of the recess cradles 14 through the screw receiving seats 13 and thereby both ends of the clamper plate 3 are pushed on upper surfaces of the wall parts 2a of both sides of the cabinet 2 and the clamper plate 3 can be strongly integrally coupled to the cabinet 2.

In addition, as shown in FIGS. 2 and 3, a pair of the elongated holes 16 formed in both ends of the clamper plate 3 are respectively fitted in a pair of the positioning protrusions 17 protrusively provided in the wall parts 2a of both sides of the cabinet 2 and also the side plate parts 18 perpendicularly folded downward from both ends of the clamper plate 3 are only abutted on outsides of the wall parts 2a of both sides of the cabinet 2 and thereby its clamper plate 3 can be positioned in backward and forward directions AA, AB and right and left directions AC, AD. Also, by engaging the engagement openings 19 provided through each of the side plate parts 18 of the clamper plate 3 with the engagement pieces 20 of the cabinet 2, its clamper plate 3 can be engaged and stopped so as not to disengage from the cabinet 2 unexpectedly.

Figure 10:
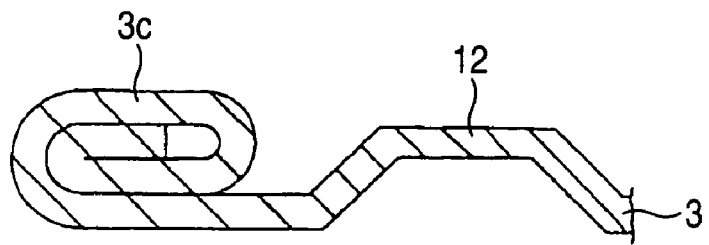
FIG. 10 is an enlarged transverse sectional view showing one example of modification of a reinforcement part.

In the embodiment described above, the spiral reinforcement part 3c with triple foldings has been shown, but it is not limited to this and as shown in FIG. 10, its spiral reinforcement part 3c may be formed in a double folding manner. In this case, strength is slightly decreased as compared with the triple foldings, but by the number of decreased foldings, the folding processing becomes simple and processing cost can be reduced.

Figure 11A:
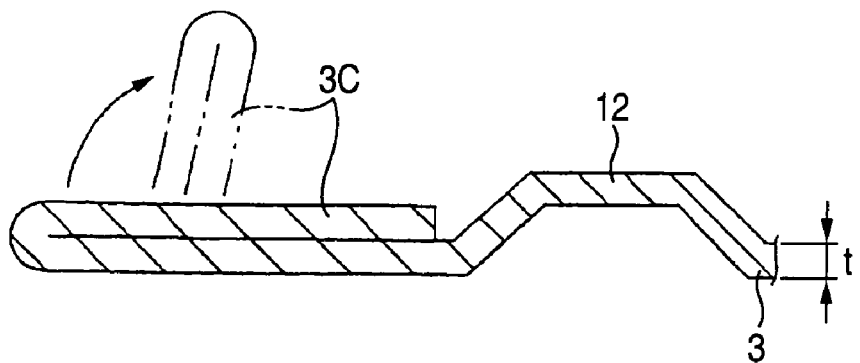
FIGS. 11A and 11B are enlarged transverse sectional views showing another example of modification of a reinforcement part.
Figure 11B:
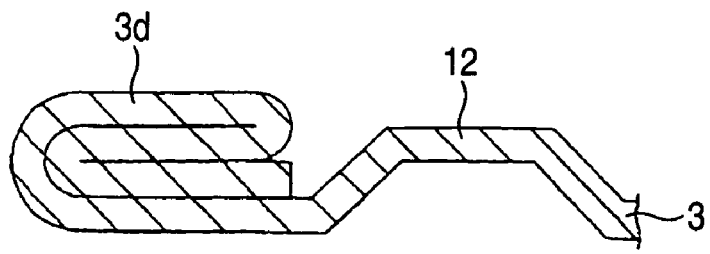

Also, as shown in FIG. 11A, after forming a folio piece 3C by folding a side edge of a clamper plate into two and closely superimposing the side edge, the folio piece 3C is folded in substantially L-letter shape from the center and as shown in FIG. 11B, a folded reinforcement part 3d may be formed by further folding the substantially L-letter shaped folio piece 3C into two and closely superimposing the folio piece 3C. In this case, the gap 9 (see FIG. 15) is absent inside the folded reinforcement part 3d, so that even when a load is imposed on its reinforcement part 3d from any directions, the strength does not decrease. Therefore, a clamper plate 3 can be formed of a steel plate with a small wall thickness t as compared with the conventional clamper plate and material cost can be reduced. Also, a clearance a for upward and downward moving a clamper 5 is increased by decreasing the wall thickness t of the clamper plate 3, so that a disk player can also be miniaturized by decreasing a height of the clamper 5 by the increased amount.

According to the invention, as shown in the embodiment (see FIGS. 1 through 8), spiral reinforcement portions are formed by closely folding both side edges of a clamper plate and strength of the clamper plate is increased to a predetermined value or more by the reinforcement portions, so that in a static load test before shipment, even when a test bar is randomly pushed on the clamper plate and a predetermined load is imposed, its clamper plate is not deformed and a strong rigid structure is formed by the clamper plate and a cabinet and protection can be provided surely so as not to damage a drive mechanism or an optical pickup placed in the inside due to a shock such as a fall.

There is no gap inside the spiral reinforcement part, so that even when a load is imposed on its reinforcement part from any directions, the strength does not decrease. Therefore, a clamper plate can be formed of a steel plate with a small wall thickness as compared with the conventional clamper plate and material cost can be reduced. Also, a clearance for upward and downward moving a clamper is increased by decreasing the wall thickness of the clamper plate, so that a disk player can also be miniaturized by decreasing a height of the clamper by the increased amount.

Further, strength of the clamper plate can be increased more by an annular reinforcement projection and linear reinforcement projections formed by partially pushing and bending the clamper plate.

Furthermore, protrusion depths of screw receiving seats formed in the centers of both ends of the clamper plate are set to sizes slightly smaller than or equal to depths of recess cradles formed in wall parts of both sides of the cabinet, so that the screw receiving seats are fitted into the recess cradles and screws are screwed into screw holes of the recess cradles through the screw receiving seats and thereby both ends of the clamper plate are pushed on upper surfaces of the wall parts of both sides of the cabinet and the clamper plate can be strongly integrally coupled to the cabinet.

In addition, a pair of elongated holes formed in both ends of the clamper plate are respectively fitted in a pair of positioning protrusions protrusively provided in the wall parts of both sides of the cabinet and also side plate parts perpendicularly folded downward from both ends of the clamper plate are only abutted on outsides of the wall parts of both sides of the cabinet and thereby its clamper plate can be positioned in backward and forward directions and right and left directions. Also, by engaging engagement openings provided through each of the side plate parts of the clamper plate with engagement pieces of the cabinet, its clamper plate can be engaged and stopped so as not to disengage from the cabinet unexpectedly.

According to the invention, strength of a clamper plate is increased to a predetermined value or more by reinforcement portions formed by folding both side edges of the clamper plate in a small folding manner, so that in a static load test before shipment, even when a test bar is randomly pushed on the clamper plate and a predetermined load is imposed, its clamper plate is not deformed and a strong rigid structure is formed by the clamper plate and a cabinet and protection can be provided surely so as not to damage a drive mechanism or an optical pickup placed in the inside due to a shock such as a fall.

According to the invention, spiral reinforcement portions are formed by closely folding both side edges of the clamper plate and there is no gap inside the reinforcement part, so that even when a load is imposed on its spiral reinforcement part from any directions, the strength does not decrease. Therefore, a clamper plate can be formed of a steel plate with a small wall thickness as compared with the conventional clamper plate and material cost can be reduced. Also, a clearance for upward and downward moving a clamper is increased by decreasing the wall thickness of the clamper plate, so that a disk player can also be miniaturized by decreasing a height of the clamper by the increased amount.

According to the invention, fold-shaped reinforcement portions are formed by twice performing a step of folding both side edges of the clamper plate into two and closely superimposing the edges and there is no gap inside the reinforcement part, so that even when a load is imposed on its spiral reinforcement part from any directions, the strength does not decrease. Therefore, a clamper plate can be formed of a steel plate with a small wall thickness as compared with the conventional clamper plate and material cost can be reduced. Also, a clearance for upward and downward moving a clamper is increased by decreasing the wall thickness of the clamper plate, so that a disk player can also be miniaturized by decreasing a height of the clamper by the increased amount.

According to the invention, strength of the clamper plate can be increased more by an annular reinforcement projection and linear reinforcement projections formed by partially pushing and bending the clamper plate.

According to the invention, protrusion depths of screw receiving seats formed in the centers of both ends of the clamper plate are set to sizes slightly smaller than or equal to depths of recess cradles formed in wall parts of both sides of the cabinet, so that the screw receiving seats are fitted into the recess cradles and screws are screwed into screw holes of the recess cradles through the screw receiving seats and thereby both ends of the clamper plate are pushed on upper surfaces of the wall parts of both sides of the cabinet and the clamper plate can be strongly integrally coupled to the cabinet.

According to the invention, a pair of elongated holes formed in both ends of the clamper plate are respectively fitted in a pair of positioning protrusions protrusively provided in the wall parts of both sides of the cabinet and also side plate parts perpendicularly folded downward from both ends of the clamper plate are only abutted on outsides of the wall parts of both sides of the cabinet and thereby its clamper plate can be positioned in backward and forward directions and right and left directions.

According to the invention, by engaging engagement openings provided through each of the side plate parts of the clamper plate with engagement pieces of the cabinet, its clamper plate can be engaged and stopped so as not to disengage from the cabinet unexpectedly.

According to a first aspect of the invention, there is provided a disk player for rotating a disk and reads information recorded on the disk, the disk player including: a cabinet; a disk tray on which the disk is placed and retractively disposed in the cabinet; a clamper plate made of steel in which both ends thereof being bridged between wall parts provided on both sides of the cabinet; a turntable disposed in the cabinet and moves the disk placed on the disk tray in an up-and-down direction, and rotates the disk; a clamper engaged in a guide hole formed in a center of the clamper plate so as to move in an up-and-down direction within a predetermined range, and clamps the disk with the turntable; an optical pickup that reads the information recorded on the disk; a reinforcement portions in which formed by folding up both side edges of the clamper plate; an annular reinforcement projection formed by partially bending the clamper plate in a downward direction and surrounds the periphery of the guide hole; linear reinforcement projections extending from the annular reinforcement projection toward both ends of the clamper plate; screw receiving seats formed by folding both ends of the clamper plate at center part in a downward direction; recess cradles into which the screw receiving seats are fitted, and formed in the wall parts of the cabinet at a position where opposed to the screw receiving seats; a pair of elongated holes formed in both ends of the clamper plate; a pair of positioning protrusions protrusively provided in the wall parts of the cabinet, and into which the pair of elongated holes are respectively fitted; side plate parts formed by perpendicularly folding both ends of the clamper plate in a downward direction, the plate parts that abut on outsides of the wall parts of both sides of the cabinet; engagement pieces protrusively provided on outsides of the wall parts of the cabinet; and engagement openings formed on each of the side plate parts and removably engages with the engagement pieces, wherein the reinforcement portions are spirally formed by closely folding up both side edges of the clamper plate in a manner of winding at least two times, wherein protrusion depths of the screw receiving seats are configured to be slightly smaller than or equal to depths of the recess cradles, and wherein the clamper plate is fixed to the wall parts of the cabinet by screws that are screwed into screw holes formed on the recess cradles through the screw receiving seats, whereby both ends of the clamper plate are pushed on upper surfaces of the wall parts.

The configuration described above corresponds to one embodiment (see FIGS. 1 through 8), and according to this, spiral reinforcement portions are formed by closely folding both side edges of a clamper plate and strength of the clamper plate is increased to a predetermined value or more by the reinforcement portions, so that in a static load test before shipment, even when a test bar is randomly pushed on the clamper plate and a predetermined load is imposed, its clamper plate is not deformed and a strong rigid structure is formed by the clamper plate and a cabinet and protection can be provided surely so as not to damage a drive mechanism or an optical pickup placed in the inside due to a shock such as a fall.

There is no gap inside the spiral reinforcement part, so that even when a load is imposed on its reinforcement part from any directions, the strength does not decrease. Therefore, a clamper plate can be formed of a steel plate with a small wall thickness as compared with the conventional clamper plate and material cost can be reduced. Also, a clearance for upward and downward moving a clamper is increased by decreasing the wall thickness of the clamper plate, so that a disk player can also be miniaturized by decreasing a height of the clamper by the increased amount.

Further, strength of the clamper plate can be increased more by an annular reinforcement projection and linear reinforcement projections formed by partially pushing and bending the clamper plate.

Furthermore, protrusion depths of screw receiving seats formed in the centers of both ends of the clamper plate are set to sizes slightly smaller than or equal to depths of recess cradles formed in wall parts of both sides of the cabinet, so that the screw receiving seats are fitted into the recess cradles and screws are screwed into screw holes of the recess cradles through the screw receiving seats and thereby both ends of the clamper plate are pushed on upper surfaces of the wall parts of both sides of the cabinet and the clamper plate can be strongly integrally coupled to the cabinet.

In addition, a pair of elongated holes formed in both ends of the clamper plate are respectively fitted in a pair of positioning protrusions protrusively provided in the wall parts of both sides of the cabinet and also side plate parts perpendicularly folded downward from both ends of the clamper plate are only abutted on outsides of the wall parts of both sides of the cabinet and thereby its clamper plate can be positioned in backward and forward directions and right and left directions. Also, by engaging engagement openings provided through each of the side plate parts of the clamper plate with engagement pieces of the cabinet, its clamper plate can be engaged and stopped so as not to disengage from the cabinet unexpectedly.

According to a second aspect of the invention, there is provided a disk player for rotating a disk and reads information recorded on the disk, the disk player including: a cabinet; a disk tray on which the disk is placed and retractively disposed in the cabinet; a clamper plate made of steel in which both ends thereof being bridged between wall parts provided on both sides of the cabinet; a turntable disposed in the cabinet and moves the disk placed on the disk tray in an up-and-down direction, and rotates the disk; a clamper engaged in a guide hole formed in a center of the clamper plate so as to move in an up-and-down direction within a predetermined range, and clamps the disk with the turntable; an optical pickup that reads the information recorded on the disk; and a reinforcement portions in which formed by folding up both side edges of the clamper plate.

According to the configuration described above, strength of a clamper plate is increased to a predetermined value or more by reinforcement portions formed by folding both side edges of the clamper plate in a small folding manner, so that in a static load test before shipment, even when a test bar is randomly pushed on the clamper plate and a predetermined load is imposed, its clamper plate is not deformed and a strong rigid structure is formed by the clamper plate and a cabinet and protection can be provided surely so as not to damage a drive mechanism or an optical pickup placed in the inside due to a shock such as a fall.

In the second aspect of the invention, the reinforcement portions may be spirally formed by closely folding up both side edges of the clamper plate in a manner of winding at least two times.

According to the configuration described above, spiral reinforcement portions are formed by closely folding both side edges of the clamper plate and there is no gap inside the reinforcement part, so that even when a load is imposed on its spiral reinforcement part from any directions, the strength does not decrease. Therefore, a clamper plate can be formed of a steel plate with a small wall thickness as compared with the conventional clamper plate and material cost can be reduced. Also, a clearance for upward and downward moving a clamper is increased by decreasing the wall thickness of the clamper plate, so that a disk player can also be miniaturized by decreasing a height of the clamper by the increased amount.

In the second aspect of the invention, there may be configured that the reinforcement portions are formed in folded shape by closely folding both side edges of the clamper plate into two for two times.

According to the configuration described above, fold-shaped reinforcement portions are formed by twice performing a step of folding both side edges of the clamper plate into two and closely superimposing the edges and there is no gap inside the reinforcement part, so that even when a load is imposed on its spiral reinforcement part from any directions, the strength does not decrease. Therefore, a clamper plate can be formed of a steel plate with a small wall thickness as compared with the conventional clamper plate and material cost can be reduced. Also, a clearance for upward and downward moving a clamper is increased by decreasing the wall thickness of the camper plate, so that a disk player can also be miniaturized by decreasing a height of the clamper by the increased amount.

In the second aspect of the invention, the disk player may further include: an annular reinforcement projection formed by partially bending the clamper plate in a downward direction and surrounds the periphery of the guide hole; and linear reinforcement projections extending from the annular reinforcement projection toward both ends of the clamper plate.

According to the configuration described above, strength of the clamper plate can be increased more by an annular reinforcement projection and linear reinforcement projections formed by partially pushing and bending the clamper plate.

In the second aspect of the invention, the disk player may further include: screw receiving seats formed by folding both ends of the clamper plate at center part in a downward direction; and recess cradles into which the screw receiving seats are fitted, and formed in the wall parts of the cabinet at a position where opposed to the screw receiving seats, wherein protrusion depths of the screw receiving seats are configured to be slightly smaller than or equal to depths of the recess cradles, wherein the clamper plate is fixed to the wall parts of the cabinet by screws that are screwed into screw holes formed on the recess cradles through the screw receiving seats, whereby both ends of the clamper plate are pushed on upper surfaces of the wall parts.

According to the configuration described above, protrusion depths of screw receiving seats formed in the centers of both ends of the clamper plate are set to sizes slightly smaller than or equal to depths of recess cradles formed in wall parts of both sides of the cabinet, so that the screw receiving seats are fitted into the recess cradles and screws are screwed into screw holes of the recess cradles through the screw receiving seats and thereby both ends of the clamper plate are pushed on upper surfaces of the wall parts of both sides of the cabinet and the clamper plate can be strongly integrally coupled to the cabinet.

In the second aspect of the invention, the disk player may further include: a pair of elongated holes formed in both ends of the clamper plate; a pair of positioning protrusions protrusively provided in the wall parts of the cabinet, and into which the pair of elongated holes are respectively fitted; and side plate parts formed by perpendicularly folding both ends of the clamper plate in a downward direction, the plate parts that abut on outsides of the wall parts of both sides of the cabinet.

According to the configuration described above, a pair of elongated holes formed in both ends of the clamper plate are respectively fitted in a pair of positioning protrusions protrusively provided in the wall parts of both sides of the cabinet and also side plate parts perpendicularly folded downward from both ends of the clamper plate are only abutted on outsides of the wall parts of both sides of the cabinet and thereby its clamper plate can be positioned in backward and forward directions and right and left directions.

In the above configuration, the disk player may further include: engagement pieces protrusively provided on outsides of the wall parts of the cabinet; and engagement openings formed on each of the side plate parts and removably engages with the engagement pieces.

According to the configuration described above, by engaging engagement openings provided through each of the side plate parts of the clamper plate with engagement pieces of the cabinet, its clamper plate can be engaged and stopped so as not to disengage from the cabinet unexpectedly.

Although the present invention has been shown and described with reference to a specific preferred embodiment, various changes and modifications will be apparent to those skilled in the art from the teachings herein. Such changes and modifications as are obvious are deemed to come within the spirit, scope and contemplation of the invention as defined in the appended claims.

What is claimed is:

1. A disk player for rotating a disk and reading information recorded on the disk, the disk player comprising:
a cabinet;
a disk tray on which the disk is placed and retractively disposed in the cabinet;
a clamper plate made of steel in which both ends thereof being bridged between wall parts provided on both sides of the cabinet;
a turntable disposed in the cabinet, the turntable moves the disk placed on the disk tray in an up-and-down direction, and rotates the disk;
a clamper engaged in a guide hole formed in a center of the clamper plate so as to move in an up-and-down direction within a predetermined range, and clamps the disk with the turntable;
an optical pickup that reads the information recorded on the disk;
a reinforcement portions formed by folding up both side edges of the clamper plate;
an annular reinforcement projection formed by partially bending the clamper plate in a downward direction and surrounding the periphery of the guide hole;
linear reinforcement projections extending from the annular reinforcement projection toward both ends of the clamper plate;
screw receiving seats formed by folding both ends of the clamper plate at center part in a downward direction;
recess cradles into which the screw receiving seats are fitted, and formed in the wall parts of the cabinet at a position where opposed to the screw receiving seats;
a pair of elongated holes formed in both ends of the clamper plate;
a pair of positioning protrusions provided in the wall parts of the cabinet, and into which the pair of elongated holes are respectively fitted;
side plate parts formed by perpendicularly folding both ends of the clamper plate in a downward direction, the plate parts that abut on outsides of the wall parts of both sides of the cabinet;
engagement pieces protrusively provided on outsides of the wall parts of the cabinet; and
engagement openings formed on each of the side plate parts and removably engages with the engagement pieces,
wherein the reinforcement portions are spirally formed by closely folding up both side edges of the clamper plate in a manner of winding at least two times,
wherein protrusion depths of the screw receiving seats are configured to be slightly smaller than or equal to depths of the recess cradles, and
wherein the clamper plate is fixed to the wall parts of the cabinet by screws that are screwed into screw holes formed on the recess cradles through the screw receiving seats, whereby both ends of the clamper plate are pushed on upper surfaces of the wall parts.

2. A disk player for rotating a disk and reading information recorded on the disk, the disk player comprising:
a cabinet;
a disk tray on which the disk is placed and retractively disposed in the cabinet;
a clamper plate made of steel in which both ends thereof being bridged between wall parts provided on both sides of the cabinet;
a turntable disposed in the cabinet, the turntable moves the disk placed on the disk tray in an up-and-down direction, and rotates the disk;
a clamper engaged in a guide hole formed in a center of the clamper plate so as to move in an up-and-down direction within a predetermined range, and clamps the disk with the turntable;
an optical pickup that reads the information recorded on the disk;
an annular reinforcement projection formed by partially bending the clamper plate in a downward direction and surrounding the periphery of the guide hole; and
linear reinforcement projections extending from the annular reinforcement projection toward both ends of the clamper plate,
wherein both side edges of the clamper plate are closely folded so as to be overlapped with the plate without forming a gap therebetween, thereby forming reinforcement portions.

3. The disk player according to claim 2, wherein the folding of the side edges of the clamper plate to form the reinforcement portions is in the shape of a spiral of at least two revolutions.

4. The disk player according to claim 2, wherein both side edges of the clamper plate are closely folded two times, thereby forming the reinforcement portions.

5. A disk player for rotating a disk and reading information recorded on the disk, the disk player comprising:
a cabinet
a disk tray on which the disk is placed and retractively disposed in the cabinet;
a clamper plate made of steel in which both ends thereof being bridged between wall parts provided on both sides of the cabinet;
a turntable disposed in the cabinet, the turntable moves the disk placed on the disk tray in an up-and-down direction, and rotates the disk;
a clamper engaged in a guide hole formed in a center of the clamper plate so as to move in an up-and-down direction within a predetermined range, and clamps the disk with the
an optical pickup that reads the information recorded on the disk; and
reinforcement portions formed by folding up both side edges of the clamper plate;
further comprising:
screw receiving seats formed by folding both ends of the clamper plate at center part in a downward direction; and
recess cradles into which the screw receiving seats are fitted, and formed in the wall parts of the cabinet at a position where opposed to the screw receiving seats,
wherein protrusion depths of the screw receiving seats are configured to be slightly smaller than or equal to depths of the recess cradles,
wherein the clamper plate is fixed to the wall parts of the cabinet by screws that are screwed into screw holes formed on the recess cradles through the screw receiving seats, whereby both ends of the clamper plate are pushed on upper surfaces of the wall parts.

6. The disk player according to claim 5, wherein the folding of the side edges of the clamper plate to form the reinforcement portions is in the shape of a spiral.

7. The disk player according to claim 5, wherein both side edges of the clamper plate are closely folding both side edges of the clamper plate into two for two times, thereby forming the reinforcement portions.

8. A disk player for rotating a disk and reading information recorded on the disk, the disk player comprising:
a cabinet a disk tray on which the disk is placed and retractively disposed in the cabinet;

a clamper plate made of steel in which both ends thereof being bridged between wall parts provided on both sides of the cabinet;

a turntable disposed in the cabinet, the turntable moves the disk placed on the disk tray in an up-and-down direction, and rotates the disk;

a clamper engaged in a guide hole formed in a center of the clamper plate so as to move in an up-and-down direction within a predetermined range, and clamps the disk with the turntable;

an optical pickup that reads the information recorded on the disk; and a reinforcement portions in which formed by folding up both side edges of the clamper plate;

further comprising:

a pair of elongated holes formed in both ends of the clamper plate;

a pair of positioning protrusions protrusively provided in the wall parts of the cabinet, and into which the pair of elongated holes are respectively fitted; and side plate parts formed by perpendicularly folding both ends of the clamper plate in a downward direction, the plate parts that abut on outsides of the wall parts of both sides of the cabinet.

9. The disk player according to claim 8 further comprising:

engagement pieces protrusively provided on outsides of the wall parts of the cabinet; and engagement openings formed on each of the side plate parts and removably engages with the engagement pieces.

10. The disk player according to claim 8, further comprising reinforcement portions formed by folding up both side edges of the clamper plate.

11. The disk player according to claim 8, wherein the folding of the side edges of the clamper plate to form the reinforcement portions is in the shape of a spiral.

12. The disk player according to claim 10, wherein both side edges of the clamper plate are folded a first time to form a double thickness, and folded a second time to form a quadruple thickness, thereby forming the reinforcement portions.

\* \* \* \* \*